United States Patent
Neuner

(10) Patent No.: US 8,826,655 B2
(45) Date of Patent: Sep. 9, 2014

(54) VEHICLE HAVING AN AUTOMATIC TRANSMISSION AND AN AUTOMATIC ENGINE START/STOP SYSTEM

(75) Inventor: Josef Neuner, Raubling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/617,443

(22) Filed: Sep. 14, 2012

(65) Prior Publication Data

US 2013/0008154 A1 Jan. 10, 2013

Related U.S. Application Data

(63) Continuation of application No. PCT/EP2011/001927, filed on Apr. 15, 2011.

(30) Foreign Application Priority Data

May 17, 2010 (DE) .......................... 10 2010 028 997
Jun. 17, 2010 (DE) .......................... 10 2010 030 226

(51) Int. Cl.
*F16D 31/02* (2006.01)
*F16H 61/00* (2006.01)

(52) U.S. Cl.
CPC .... *F16H 61/0021* (2013.01); *F16H 2061/0034* (2013.01); *F16H 2312/14* (2013.01)
USPC ........... 60/413; 92/24; 92/27; 92/28; 475/129

(58) Field of Classification Search
USPC ........ 60/413, 414, 417, 404, 406; 477/27, 52; 92/27, 28, 24; 137/601.2; 475/129
See application file for complete search history.

(56) References Cited

U.S. PATENT DOCUMENTS

| | | | | |
|---|---|---|---|---|
| 787,489 A * | 4/1905 | Bergh | ............................... | 92/24 |
| 1,872,279 A * | 8/1932 | Hallett | ........................... | 184/6.3 |
| 2,118,890 A * | 5/1938 | Maes | ................................. | 92/19 |
| 2,139,185 A * | 12/1938 | Engel | ............................... | 91/468 |
| 2,225,539 A | 12/1940 | Persson et al. | | |
| 3,138,221 A | 6/1964 | Kofink et al. | | |

(Continued)

FOREIGN PATENT DOCUMENTS

| | | | |
|---|---|---|---|
| BE | 394442 | * | 3/1933 |
| CH | 241 736 | | 8/1946 |

(Continued)

OTHER PUBLICATIONS

DE 102006014756—From Applicant's IDS; Machine translation from espacenet of specification.*

(Continued)

*Primary Examiner* — Edward Look
*Assistant Examiner* — Michael Quandt
(74) *Attorney, Agent, or Firm* — Crowell & Moring LLP

(57) ABSTRACT

A vehicle has an internal combustion engine, an automatic transmission with an electrohydraulic transmission control unit, a transmission oil pump driven by the engine, and an electronic engine start and stop system. The start and stop systems switches off the internal combustion engine in operating phases, in which the vehicle is temporarily stopped, if predefined operating parameters are present, and starts the internal combustion engine if a restart signal is present. A purely mechanical pressure accumulator device provides stored hydraulic pressure to the electrohydraulic transmission control unit in a time period following the starting of the internal combustion engine, in which time period, the transmission oil pump is still building-up pressure.

8 Claims, 1 Drawing Sheet

(56) References Cited

U.S. PATENT DOCUMENTS

| | | |
|---|---|---|
| 6,971,232 B2 | 12/2005 | Singh |
| 8,069,661 B2* | 12/2011 | Hendrickson et al. .......... 60/417 |
| 8,375,710 B2* | 2/2013 | Mellet et al. .................... 60/413 |
| 8,382,626 B2* | 2/2013 | Moorman et al. ............ 475/129 |
| 8,387,665 B2* | 3/2013 | Lundberg et al. ................ 138/31 |
| 2008/0060862 A1* | 3/2008 | Schiele et al. ................ 180/165 |
| 2010/0093488 A1* | 4/2010 | Portell et al. .................... 477/52 |
| 2011/0011074 A1* | 1/2011 | Mellet et al. .................... 60/329 |
| 2011/0209470 A1* | 9/2011 | Dougan et al. .................. 60/413 |

FOREIGN PATENT DOCUMENTS

| | | |
|---|---|---|
| CN | 1690449 A | 11/2005 |
| DE | 10 2006 014 756 A1 | 10/2007 |
| DE | 10 2006 014 758 A1 | 10/2007 |
| DE | 10 2007 002 166 A1 | 7/2008 |
| DE | 10 2009 047 828 A1 | 4/2010 |

OTHER PUBLICATIONS

BE394442—English machine translation. 1933.*

Corresponding German Office Action dated Nov. 25, 2010 with English Translation (Eight (8) pages).

Corresponding International Search Report dated May 31, 2011 with English Translation (Four (4) pages).

English translation of Chinese Office Action dated Apr. 1, 2014 (seven (7) pages).

* cited by examiner

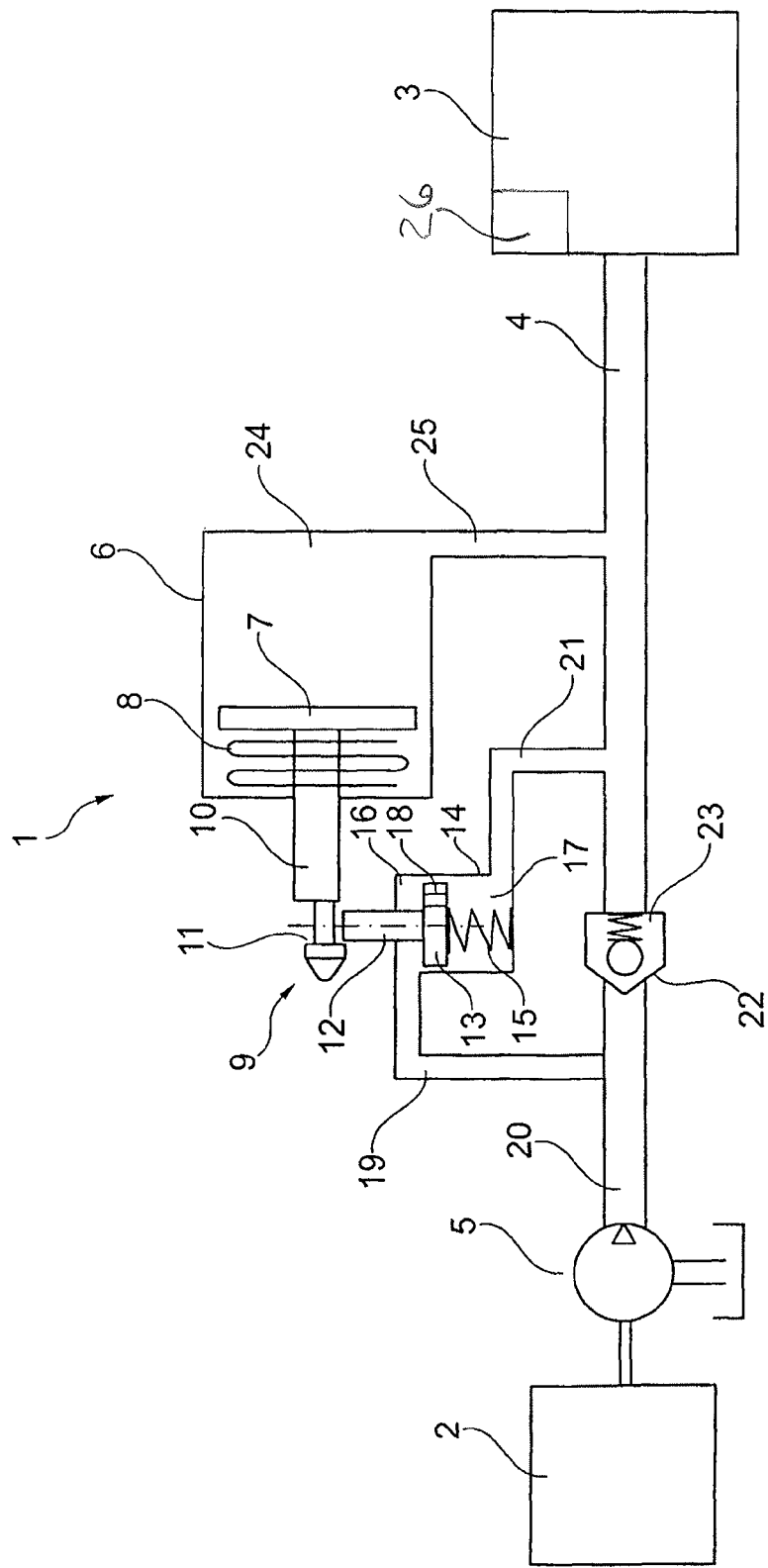

VEHICLE HAVING AN AUTOMATIC TRANSMISSION AND AN AUTOMATIC ENGINE START/STOP SYSTEM

CROSS REFERENCE TO RELATED APPLICATIONS

This application is a continuation of PCT International Application No. PCT/EP2011/001927, filed Apr. 15, 2011, which claims priority under 35 U.S.C. §119 from German Patent Application Nos. 10 2010 028 997.3, filed May 17, 2010, and 10 2010 030 226.0, filed Jun. 17, 2010, the entire disclosures of which are herein expressly incorporated by reference.

BACKGROUND AND SUMMARY OF THE INVENTION

The present invention relates to a vehicle having an automatic transmission and an automatic engine start and stop system.

Modern vehicles with internal combustion engines are increasingly being equipped with a so-called automatic engine start and stop system. In such start and stop systems, a complex electronic control and/or regulating unit operates to switch off the internal combustion engine during "travel interruptions," such as while being stopped at traffic lights, and to automatically restart the internal combustion engine, when the driver gives a "restart signal." Such engine start and stop systems were initially introduced in vehicles with a manual transmission. In vehicles with manual transmissions, the engine is switched off when the vehicle stops moving, as soon as the transmission is shifted into a neutral or idle mode and certain boundary conditions (engine oil temperature, outside temperature, etc.) are fulfilled. The internal combustion engine is automatically restarted by stepping on the clutch pedal.

Vehicles with an automatic transmission have a variety of transmission shift elements (clutches, brakes, etc.) that are actuated by an electrohydraulic system. A condition for actuation is that the oil pressure must be adequately high. When a vehicle with an automatic transmission and a transmission oil pump, which is mechanically driven by the internal combustion engine, is started, it may take less than a second for the oil pump to build up enough oil pressure for gear shifting and, in so doing, to drive off. However, in vehicles with an automatic transmission and an automatic engine start and stop system, the delay time to build up the oil pressure required to drive off after starting the internal combustion engine must be as small possible, because in the "stop and go mode" the standard startup delay time of several tenths of a second would not be accepted by customers.

The object of the present invention is to provide a vehicle that has an internal combustion engine, an automatic transmission and an automatic engine start and stop system, wherein an engine start and stop mode enables as small a startup delay as possible after starting the internal combustion engine.

This and other objects are achieved by a vehicle equipped with an internal combustion engine, an automatic transmission, which has an electrohydraulic transmission control unit, a transmission oil pump, which is driven directly or indirectly by the internal combustion engine, and an electronic engine start and stop system, which switches off the internal combustion engine in operating phases, in which the vehicle is temporarily stopped, if predefined operating parameters are present, and starts the internal combustion engine if a restart signal is present. A purely mechanical pressure accumulator device provides stored hydraulic pressure, or more particularly the stored hydraulic fluid, to the electrohydraulic transmission control unit in a time period following the starting of the internal combustion engine, in which the transmission oil pump is still building up pressure.

The starting point of the invention is a vehicle with an internal combustion engine and an automatic transmission, which has an electrohydraulic transmission control unit. The transmission shift elements, such as clutches or brakes, are hydraulically actuated by the electrohydraulic transmission control unit. The hydraulic pressure required for this purpose is supplied by a transmission oil pump that is mechanically driven by the internal combustion engine. The transmission oil pump can be mechanically driven directly or indirectly by the internal combustion engine. The transmission oil pump can be mounted, for example, on a transmission input shaft of the automatic transmission. The transmission oil pump can be, for example, a gear pump or a rotary vane pump.

Furthermore, the vehicle has an electronic engine start and stop system, which "automatically" switches off the internal combustion engine in operating phases, in which the vehicle is temporarily stopped, such as in "stop and go mode," at a red light etc., if predefined operating parameters are present. The start and stop system automatically starts the internal combustion engine if a "restart signal" that is predefined by the driver is present.

According to an aspect of the invention, a purely mechanical pressure or more particularly a volume accumulator device intended for storing hydraulic fluid provides the stored hydraulic pressure, or rather the stored hydraulic fluid, to the electrohydraulic transmission control unit in a time period following the restarting of the internal combustion engine, in which the transmission oil pump is still building-up pressure.

It is important that the "triggering" or rather the emptying of the pressure accumulator device or, more specifically, the volume accumulator device, after restarting the internal combustion engine occurs by purely mechanical measures and/or purely hydraulic measures alone—that is, without electrically actuated components. In this context "triggering" means "switching over" the pressure accumulator device or rather the volume accumulator device from one state, in which it stores the hydraulic fluid, into a state, in which it pushes the stored hydraulic fluid into the hydraulic system of the transmission control unit and, in so doing, moves this transmission control unit directly into a ready-to-run state.

The signal that is necessary for triggering is formed by the buildup of pressure that is generated by the transmission oil pump driven by the internal combustion engine.

On the whole, the "loading," the "pressure storage" and the "discharging" of the pressure accumulator device, or more specifically the volume accumulator device, occur by purely mechanical devices or, more specifically, by purely hydromechanical/hydraulic devices alone—that is, without any electrical and/or electronic control or regulating unit and without any electrical and/or electronic components.

This approach has the advantage of achieving with a simple and cost effective design that the transmission shift operations that are required for startup can be carried out with nearly zero delay directly after starting the internal combustion engine. Therefore, in contrast to conventional vehicles with automation transmissions, it is possible to produce a significantly faster "startup readiness."

According to a further aspect of the invention, the pressure accumulator device has an accumulator cylinder with an accumulator piston, which is arranged in a displaceable manner in the accumulator cylinder. This accumulator piston is prestressed by way of a spring in a direction, in which pressure is applied, and can be locked in a tensioned state by a purely mechanical locking device. If the internal combustion engine is switched off and then restarted again, it is only required that the locking device be released, in order to convert the spring energy, stored in the spring, into hydraulic pressure and, in so doing, to bridge the time period until the transmission oil pump has reached its normal operating pressure.

The locking device can be formed by a locking piston that interacts with the accumulator piston and that is arranged in a displaceable manner in a locking cylinder. The locking piston can be provided with a locking pin, which can engage with a recess of a piston rod of the accumulator piston. In the engaged state the locking device locks. The locking piston can be prestressed by use of a locking spring in the direction of its locking position.

According to a further aspect of the invention, the locking piston has a passage borehole that acts as an orifice. The locking cylinder is divided by the locking piston into first and second locking cylinder chambers, and the first and second locking cylinder chambers are in fluid communication with each other by way of the passage borehole.

The first locking cylinder chamber can be in direct fluid communication with a pressure output of the transmission oil pump. Furthermore, the pressure output of the transmission oil pump can be in fluid communication with the second locking cylinder chamber and the electrohydraulic transmission control unit by way of a check valve. The check valve is arranged such that it can be opened by way of the hydraulic pressure of the transmission oil pump (and locked in the reverse direction of pressure).

It is especially important that the locking spring builds up enough static pressure that the locking piston is actuated.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 is a schematic diagram of an exemplary embodiment illustrating the basic principle of the invention.

DETAILED DESCRIPTION OF THE DRAWING

FIG. 1 shows a pressure accumulator device 1 for a vehicle that is driven by an internal combustion engine 2 and that has an automatic transmission 3 and an automatic engine start and stop system (not illustrated). The automatic engine start and stop system is provided for the purpose of automatically switching off the internal combustion engine 2 in operating phases, in which the vehicle is temporarily stopped, if predefined operating parameters are present, and for the purpose of automatically restarting the internal combustion engine if a restart signal that is predefined by the driver is present.

The automatic transmission 3 has one or more shift elements (for example, clutches, brakes, etc.), which are actuated by an electrohydraulic transmission control unit 26. For the actuation of these shift elements, the automatic transmission 3 is provided with hydraulic pressure by way of an input line providing a pressure input 4. The input pressure is generated by a transmission oil pump 5 that is mechanically driven by the internal combustion engine 2.

If the internal combustion engine 2 is temporarily switched off by the automatic engine start and stop system, then the hydraulic pressure drops at the pressure input 4. If, thereupon, the internal combustion engine 2 is restarted again, it may take a few tenths of a second before the mechanical transmission oil pump 5 has reached again its full operating pressure. The pressure accumulator device 1 makes it possible to achieve, nevertheless, with next to zero delay time that the hydraulic pressure, required to start up—that is, for shifting the transmission shift elements of the automatic transmission 3—is available at the pressure input 4 to the automatic transmission 3.

For this purpose, the pressure accumulator device 1 has an accumulator cylinder 6, in which an accumulator piston 7 is arranged in a displaceable manner. The accumulator piston 7, which is in a "loaded" position in the position shown in FIG. 1, is prestressed (to the right in the Figure) by way of a compression spring 8. In the state shown in FIG. 1, the accumulator piston 7 is held in the "loaded" position. A piston rod 10, which is connected to the accumulator piston 7, has a recess 11, with which a locking pin 12, which is connected to a locking piston 13, engages. The locking piston 13 is arranged in a displaceable manner in a locking cylinder 14. The locking piston 13 is prestressed in the locking direction by way of a spring 15, which in this case is arranged in the locking cylinder 14.

The locking piston 13 divides the locking cylinder 14 into a first locking cylinder chamber 16 and a second locking cylinder chamber 17. The locking piston 13 has a passage borehole 18, which acts as an orifice and by way of which the two locking cylinder chambers 16, 17 are in fluid communication with each other.

The first locking cylinder chamber 16 is in fluid communication with a pressure output 20 of the mechanical transmission oil pump 5 by way of the fluid line 19. The second locking cylinder chamber 17 is in fluid communication with the pressure input 4 of the automatic transmission 3 by way of a fluid line 21. Between the two fluid lines 19, 21 and between the pressure output 20 of the mechanical transmission oil pump 5 and the pressure input 4 of the automatic transmission 3 there is a check valve 22, which is prestressed by way of a spring 23 against the transmission oil pump 5. The check valve 22 can be opened by way of the hydraulic pressure of the transmission oil pump 5 and locks in the reverse direction.

The aforementioned accumulator cylinder 6 has an accumulator chamber 24, which is in fluid communication with the pressure input 4 of the automatic transmission 3 by way of a fluid line 25.

The operating principle of the pressure accumulator device 1 is explained in detail below. If the internal combustion engine 2 is switched off by the automatic engine start and stop system, then the pressure drops, as stated above, at the pressure input 4. At the same time, the accumulator chamber 24 continues to be completely filled with hydraulic fluid.

If the internal combustion engine is started again, then the mechanical transmission oil pump 5, which can be connected directly to the crankshaft of the internal combustion engine 2, starts up and builds-up the hydraulic pressure, required to shift the automatic transmission 3, in a few tenths of a second. At the same time, the check valve 22 is still locked in the pressure build-up phase.

In this case, the hydraulic pressure built up by the transmission oil pump 5 is applied over the hydraulic line 19 to the side of the locking piston 13 that faces the first locking cylinder chamber 16. This pushes the locking piston 13 downward against the pressure force exerted by the locking spring 15, as a result of which the locking device 9 is opened.

Following the opening of the locking device 9, the accumulator piston 7 is pushed to the right by the compression spring 8. At the same time the spring energy, which is stored in the compression spring 8, is converted into hydraulic pressure by way of the hydraulic fluid that may be found in the accumulator chamber 24. Then, this hydraulic pressure is directly available at the pressure input 4. Hence, the automatic transmission 3 can be shifted with virtually no delay directly after starting the internal combustion engine, a feature that enables a nearly zero startup delay time directly after the internal combustion engine start.

When the internal combustion engine 2 is running, the accumulator cylinder 6 is filled, as a result of which the pressure level in the fluid lines 19 and 21 is approximately the same, so that the locking piston 13 moves again into its locking position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    an internal combustion engine;
    an automatic transmission having an electrohydraulic transmission control unit;
    a transmission oil pump operatively configured to be driven directly or indirectly by the internal combustion engine;
    an electronic engine start and stop system, said start and stop system switching off the internal combustion engine in operating phases in which the vehicle is temporarily stopped if predefined operating parameters are met, and starting the internal combustion engine upon a restart signal; and
    a mechanical pressure accumulator device operatively configured to provide stored hydraulic pressure to the electrohydraulic transmission control unit in a time period after starting of the internal combustion engine in which the transmission oil pump is continuing to build-up pressure,
    wherein
        a switching over of the pressure accumulator device from a tensioned state into a relaxed state, in which the stored hydraulic fluid is pushed out of the pressure accumulator device into a hydraulic system of the electrohydraulic transmission control unit, occurs via at least one of only mechanical and hydraulic operation without any electrically actuated components,
        the mechanical pressure accumulator device comprises an accumulator cylinder;
            an accumulator piston operatively arranged in a displaceable manner in the accumulator cylinder;
            a spring operatively configured to prestress the accumulator piston in a direction in which pressure is applied; and
            a mechanical locking device operatively configured for locking the accumulator piston in a tensioned state against spring force of the spring,
        the mechanical locking device comprises a locking piston operatively configured to interact with the accumulator piston, the locking piston being arranged in a displaceable manner in a locking cylinder,
        the locking piston comprises a locking pin engageable with a recess of a piston rod of the accumulator piston, wherein the locking piston comprises a passage borehole acting as an orifice, and
        the locking piston is prestressed via a locking spring in a direction of a locking position.

2. The vehicle according to claim 1, wherein the locking cylinder is divided by the locking piston into first and second locking cylinder chambers.

3. The vehicle according to claim 2, wherein the first locking cylinder chamber is in fluid communication with a pressure output of the transmission oil pump.

4. The vehicle according to claim 3, further comprising:
    a check valve through which a pressure output of the transmission oil pump is in fluid communication with the second locking cylinder chamber and the electrohydraulic transmission control unit.

5. The vehicle according to claim 4, wherein the check valve is operatively configured to be openable via hydraulic pressure of the transmission oil pump and closeable in a reverse direction of the hydraulic pressure.

6. The vehicle according to claim 2, further comprising:
    a check valve through which a pressure output of the transmission oil pump is in fluid communication with the second locking cylinder chamber and the electrohydraulic transmission control unit.

7. The vehicle according to claim 6, wherein the check valve is operatively configured to be openable via hydraulic pressure of the transmission oil pump and closeable in a reverse direction of the hydraulic pressure.

8. The vehicle according to claim 1, wherein a signal triggering the switching over is formed by a build-up of pressure generated by the transmission oil pump that is driven by the internal combustion engine.

* * * * *